United States Patent
Sano et al.

(10) Patent No.: US 7,158,679 B2
(45) Date of Patent: Jan. 2, 2007

(54) IMAGE COMPRESSION WITH TILE ALIGNMENT

(75) Inventors: Yutaka Sano, Miyagi (JP); Hiroyuki Sakuyama, Tokyo (JP); Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 852 days.

(21) Appl. No.: 10/156,093

(22) Filed: May 29, 2002

(65) Prior Publication Data

US 2002/0196970 A1   Dec. 26, 2002

(30) Foreign Application Priority Data

May 29, 2001  (JP)  .............................. 2001-159984

(51) Int. Cl.
*G06K 9/36* (2006.01)
*G06K 9/40* (2006.01)

(52) U.S. Cl. .................. 382/232; 382/268; 382/166
(58) Field of Classification Search .................... None
See application file for complete search history.

(56) References Cited

U.S. PATENT DOCUMENTS

| | | | | |
|---|---|---|---|---|
| 5,428,395 A | * | 6/1995 | Jeong | 375/240.14 |
| 5,687,256 A | * | 11/1997 | Kimura et al. | 382/232 |
| 5,764,807 A | * | 6/1998 | Pearlman et al. | 382/240 |
| 5,936,673 A | * | 8/1999 | Agarwal | 375/240.24 |
| 5,953,456 A | * | 9/1999 | Ikeda et al. | 382/232 |

OTHER PUBLICATIONS

"JPEG 2000 Image coding system," ISO/IEC JTC 1/SC 29/WG 1. JPEG 2000, Mar. 16, 2000, hereafter referred as N1646.*

* cited by examiner

*Primary Examiner*—Wenpeng Chen
(74) *Attorney, Agent, or Firm*—Oblon, Spivak, McClelland, Maier & Neustadt, P.C.

(57) ABSTRACT

An image compression apparatus includes a tile size determiner, an image divider and an image compression processor. The tile size determiner determines an arbitrary size of a rectangular tile for each component of a still image having a plurality of components. The image divider divides the image using the rectangular tiles the sizes of which are determined by the tile size determiner. The image compression processor performs an irreversible compression process on the image divided by said image divider.

20 Claims, 18 Drawing Sheets

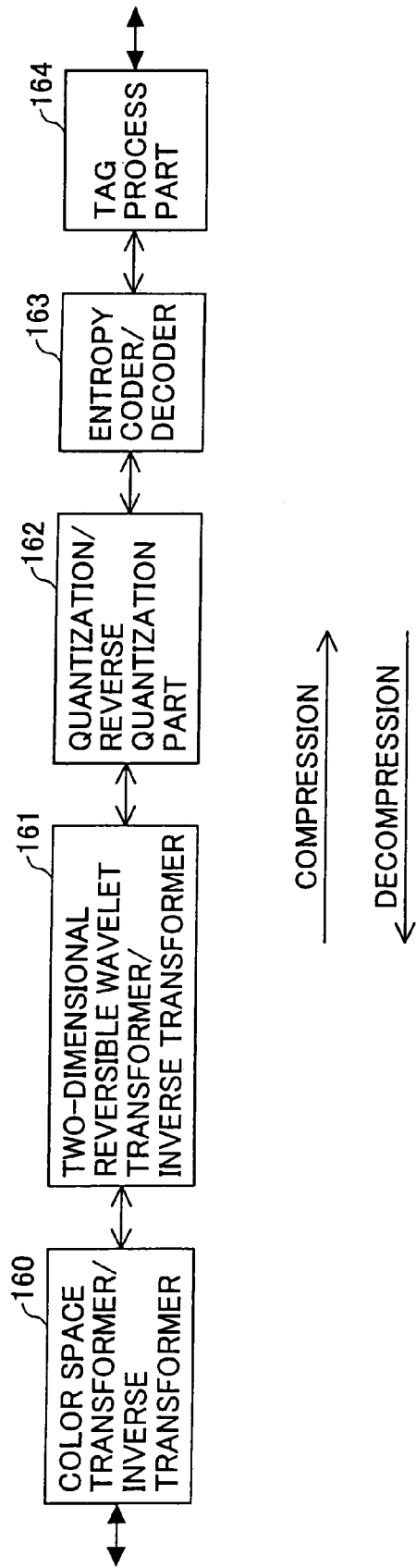

DECOMPOSITION_LEVEL_0

DECOMPOSITION_LEVEL_1

DECOMPOSITION_LEVEL_2

DECOMPOSITION_LEVEL_3

BACKGROUND ART

IMAGE COMPRESSION WITH TILE ALIGNMENT

BACKGROUND OF THE INVENTION

1. Field of the Invention

The present invention generally relates to an image compression apparatus, an image decompression apparatus, an image compression method, an image decompression method, a computer program product, and a computer-readable recording medium recording a computer-readable program.

2. Description of the Related Art

As image input technology and output technology therefor progress, color still images with high definition are in great demand these days. Taking a digital camera (DC) as an example of an image input apparatus, price reduction of a high-performance charge coupled device (CCD) having the number of pixels of three million or more has been achieved, and the high-performance CCDs have been widely used for DC products at popular prices. The CCD is greatly indebted to progress in silicone processing or semiconductor device technology for the improvement of its performance. According to the progress, the trade-off problem between miniaturization and signal-to-noise ratio has been solved. Additionally, it is said that the number of pixels will maintain an upward trend for some time.

Further, brilliant progress has been achieved in realizing high definition and low prices in products in the hard copy field such as a printer and a dye sublimation printer, and in the soft copy field of flat panel displays such as a CRT, a LCD (liquid crystal display), and a PDP (plasma display panel).

Since such image input/output products of high performance and low price have been introduced to the market, demand for high-definition still images has been increasing. It is predicted that demand for high-definition still images will increase in every field hereafter. Actually, such a trend has been accelerated by developments in technology relating to networks including personal computers (PCs) and the Internet. Especially recently, opportunities for communicating images have risen sharply since the diffusion speed of mobile devices including mobile phones and notebook type personal computers is very fast. Therefore, it is concluded that there will be more and more demand for achieving multifunctional high performance image compression/decompression technology that facilitates handling high-definition still images.

At the present time, JPEG (Joint Photographic Experts Group) is most widely used as an image compression/decompression algorithm that facilitates the handling of such high-definition still images. Additionally, JPEG 2000 became an international standard in 2001. JPEG 2000 has an algorithm of higher performance than JPEG, and at the same time, has significant multiple functions installed. For this reason, JPEG 2000 is expected to succeed JPEG as the image compression/decompression standard format of the next generation for high-definition still images.

FIG. 1 is a block diagram for explaining the basics of a JPEG algorithm. The JPEG algorithm includes a color space transformer/inverse transformer 150, a discrete cosine transformer/inverse transformer 151, a quantization/reverse quantization part-152, and an entropy coder/decoder 153.

Generally, in order to obtain a high compression rate, an irreversible encoding scheme is used. Thus, complete compression/decompression of original image data, that is, a so-called lossless compression, is not performed. However, according to this method (irreversible encoding), it is possible to eliminate the problems such as increase in transmission time and in memory size required for processing. Since JPEG has the above-mentioned advantage, JPEG is currently the most widely used compression/decompression algorithm for still images.

FIG. 2 is a block diagram for explaining the basics of the JPEG 2000 algorithm. The JPEG 2000 algorithm includes a two-dimensional reversible wavelet transformer/inverse transformer 161, a quantization/reverse quantization part 162, an entropy coder/decoder 163, and a tag processing part 164.

As mentioned above, currently, JPEG is the most widely used compression/decompression method for still images. However, demand for achieving further improved high-definition still images still exists. Accordingly, JPEG is gradually reaching its technical limit. For example, block noise and mosquito noise are becoming more conspicuous, as high definition of original images is further achieved. In other words, deterioration of image quality in JPEG files is becoming no longer negligible. For this reason, improvement in image quality at a low-bit rate, that is, in the area of high compression rate, is recognized as the most important issue of technical development.

JPEG 2000 has been developed as an algorithm that can solve the above-mentioned problems. In addition, it is predicted that in the near future, JPEG 2000 be used together with the JPEG format that currently is a mainstream format.

Comparing FIGS. 1 and 2, one of the most different points is the transforming method. JPEG employs discrete cosine transform (DCT), while JPEG 2000 employs discrete wavelet transform (DWT). The main reason why JPEG 2000 employs DWT is that DWT offers an advantage in achieving better image quality in a high compression area than DCT.

Further, another significant difference between JPEG and JPEG 2000 is that JPEG 2000 includes the tag processing part 164 for forming codes at the final stage. The tag processing part 164 generates and interprets code streams. Additionally, JPEG 2000 can realize various useful functions by employing code streams. For example, FIGS. 3A, 3B, 3C and 3D are schematic diagrams, each showing sub-bands of each decomposition level in a case where the number of decomposition levels is three. As shown in FIGS. 3A, 3B, 3C and 3D, JPEG 2000 can stop the compression/decompression process of still images in an arbitrary layer (decomposition level) corresponding to a layer of octave division in DWT on a block basis.

Additionally, as shown in FIGS. 17 and 18, in many cases, JPEG and JPEG 2000 include color space transformers/inverse transformers 150 and 160, respectively, as-input/output parts of original images. The color space transformers/inverse transformers 150 and 160 correspond to parts that perform transformation or inverse transformation from RGB color systems including components of primary colors, red (R), green (G) and blue (B) namely, or YMC color systems including components of complementary colors, yellow (Y), magenta (M) and cyan (C), to YrCb color systems or YUV color systems.

In the following, a detailed description will be given of the JPEG 2000 algorithm.

FIG. 4 is a schematic diagram showing examples of components of a color image divided into tiles. Generally, as shown in FIG. 4, each of the components 181 (R), 182 (G) and 183 (B) (here, the RGB primary color system is shown) of the color image is divided into rectangular areas (tiles) $181_t$, $182_t$ and $183_t$, respectively. The compression/decompression process is performed on each of the tiles, for example, R00 through R15, G00 through G15, and B00 through B15 independently.

In coding, data of each tile of each component are input to the color space transformer/inverse transformer 160 so that color space transformation is performed on the data. Thereafter, the data are applied with a two-dimensional wavelet transformation (direct transformation) by the two-dimensional reversible wavelet transformer/inverse transformer 161 so that the data are spatially divided into frequency bands.

FIG. 3A illustrates an original image tile (0LL, decomposition level: 0) obtained by dividing the original image into the tiles. The original image tile is transformed with a two-dimensional reversible wavelet transformation so as to divide the original image tile into sub-bands (1LL, 1HL, 1LH and 1HH) on the decomposition level 1 as shown in FIG. 3B. Then, subsequently, a low frequency component 1LL in level 1 is transformed with a two-dimensional reversible wavelet transformation. Thus, the low frequency component 1LL is divided into sub-bands (2LL, 2HL, 2LH and 2HH) on the decomposition level 2 as shown in FIG. 3C. Similarly, a low frequency component 2LL is transformed with a two-dimensional reversible wavelet transformation so that the low frequency component 2LL is divided into sub-bands (3LL, 3HL, 3LH and 3HH) on the decomposition level 3 as shown in FIG. 3D.

Further, in FIGS. 3A, 3B, 3C and 3D, the sub-bands that are targets of coding in the respective decomposition levels are indicated by gray parts. For example, as shown in FIG. 3D, when the decomposition level is three, the gray sub-bands (3HL, 3LH, 3HH, 2HL, 2LH, 2HH, 1HL, 1LH and 1HH) are targets of the coding. In this case, the subband 3LL is not coded.

Next, a bit that is a target of coding is fixed in a determined order of coding. A context is generated from bits around the target bit(s) by the quantization/reverse quantization part 162. The entropy coder/decoder 163 performs coding on the tiles in each component by probability estimation by receiving the context and the target bit.

In this way, the coding process is performed on every component of the original image on a tile by tile basis.

Last, the tag processing part 164 combines all coded data from the entropy coder/decoder 163 into a single codestream, and at the same time, performs a process of adding tags to the codestream thereof.

FIG. 5 briefly illustrates the structure of the codestream. The codestream includes a main header 191, tile-part headers 192, bit-streams 193 and a tag 194. The main header 191 and the tile-part headers 192 are tag information. The main header 191 is added to the beginning of the codestream. The tile part header 192 is added to each beginning of a tile part structuring each of the tiles. The bit stream 193 follows each of the tile-part headers 192. The bit streams 193 are coded data of the respective tiles. The tag 194 is added to the end of the codestream.

On the other hand, in decoding, contrary to the coding, the image data are generated from the data of each tile of each component in the codestream. In this case, the tag processing part 164 interprets the tag information added to the codestream that is externally input to the tag processing part 164. Then, the tag processing part 164 divides the codestream into codestreams corresponding to respective tiles of respective components. Thereafter, the tag processing part 164 independently performs an encoding process on each of the code streams corresponding to the respective tiles of the respective components. Positions of the bits that are targets of encoding are determined according to an order based on the tag information in the codestream. At the same time, the quantization/reverse quantization part 162 generates a context from an arrangement of bits (coding of which has been completed) surrounding the target bit. The entropy coder/decoder 163 receives the context and the codestream, performs encoding by possibility estimation so as to generate the target bit, and writes the generated target bit to a position of the target bit.

Thus encoded data are spatially divided for each frequency spectrum. Thus, each tile of each component of the image data is restored by transforming the decoded data with a two-dimensional reversible wavelet transformation by the two-dimensional reversible wavelet transformer/inverse transformer 161. The restored data are transformed to data-of the original color system by the color space transformer/inverse transformer 160.

Additionally, the above-mentioned idea of "tile" of JPEG 2000 can be used for the conventional JPEG compression/decompression format as an image area that is handled independently.

In the above, a description is given of a general still image. However, the above-mentioned technique may be also used for moving images. That is, by structuring each frame of a moving image as a single still image, it is possible to create (encode) or display (decode) video data at a frame speed appropriate for an application. This is a function called the motion compression/decompression process of still images. Additionally, the phrase "motion still image" is used here to indicate continuous still images in which one frame corresponds to one still image.

This method offers a function that is not provided for a video file of MPEG format widely used for moving images. In other words, the method has an advantage in that a still image of a high quality can be handled on a frame basis. Accordingly, the method is beginning to attract the attention of business fields such-as broadcasting stations. It is highly likely that the method will come into wide use for the consuming public.

Among the specifications required for the compression/decompression algorithm of the motion still images, it is processing speed that is very different from the general compression/decompression algorithm of still images. The reason is that the frame rate, having an influence on the quality of a moving image, depends on the processing speed. Therefore, at the present time, only limited methods that highly depend on hardware such as ASIC and DSP can realize the function. It is conceived that it is necessary to wait for progress in such as process device technology in the semiconductor field, parallelizing compiler technology in the software field and the like.

However, according to the above-described conventional technology, there is a problem in that "borders of tiles" stand out when the compression/decompression process is performed under a condition where the compression rate is high. Actually, volume of data of an image becomes very large when an original image that is a target of the compression/decompression process is spatially very large, or when each color component has a deep gradation level. Such a technical problem is newly raised as the above-described demand in the market for high-definition still images become higher.

When the compression/decompression process is performed on an original image having a very large volume of data, an extremely large memory area is required for maintaining a process result and a working area that processes image data. Additionally, process time required for compression or decompression also becomes very long. In order to avoid such problems, generally, an original image is divided into a rectangular region, a so-called "tile", namely, and the compression/decompression process is performed on the tile independently. Thanks to the idea of dividing a space into "tiles", it is possible to control the increase in size of memory and process time up to a practical level. As an idea of handling an image by dividing the image into regions, in addition to the above-described "tile", there is a unit called "block". The "block" is used in conventional JPEG, and includes 8×8 pixels. The object of employing the "block" is to divide the image into units of frequency transformation. On the other hand, the object of employing the "tile" is to divide the image into units of entropy coding for memory reduction and parallel operation. Thus, the "block" and the "tile" differ fundamentally. In other words, the "block" is a unit used for an operation performed in a preliminary step toward coding.

However, the new problem, that is, the above-described "elicitation (or revealing) of borders of tiles" has arisen due to dividing an original image into tiles. This phenomenon occurs when decoding compressed image data that are generated by encoding the original image by a lossy compression under a condition of high compression rate of the original image. Especially, the phenomenon has in many cases a great influence on a subjective level of image quality in displaying a moving image that employs a high compression rate.

The reason can be explained as follows. That is, a target area of calculations unexpectedly extends to areas (outside of borders of a tile(s)) having no image data when a low-pass filter/high-pass filter of a horizontal direction, and a low-pass filter/high-pass filter of a vertical direction that are used for performing a two-dimensional wavelet transformation carry out respective filter calculations. The rate of the extension is larger as the decomposition level becomes deeper.

SUMMARY OF THE INVENTION

It is a general object of the present invention to provide an improved and useful image compression apparatus, image decompression apparatus, image compression method, image decompression method, computer program product, and computer-readable recording medium recording a computer readable program in which the above-mentioned problems are eliminated.

A more specific object of the present invention is to provide an image compression apparatus, image decompression apparatus, image compression method, image decompression method, computer program product for causing a computer to function as the image compression apparatus or one or more of parts of the image compression apparatus, the image decompression apparatus or one or more of parts of the decompression apparatus, and a computer-readable recording medium recording a computer readable program code embodied therein for causing a computer to function as the image compression apparatus or one or more of the parts of the image compression apparatus, the image decompression apparatus or one or more of the parts of the image decompression apparatus that can drastically reduce "elicitation of borders of tiles" that occurs when decoding image data obtained by performing a lossy (irreversible) compression on an original image under a condition of high compression rate of the original image.

In order to achieve the above-mentioned objects, there is provided according to one aspect of the present invention, an image compression apparatus, including; a tile size determiner that determines the size of a rectangular tile for each component of a still image having a plurality of components, the size being determined arbitrarily; an image divider that divides the still image using the rectangular tiles, the sizes of the rectangular tiles being determined by the tile size determiner; and an image compression processor that performs an irreversible compression process on the still image divided by the image divider.

According to the above-mentioned aspect of the present invention, tile division of an original image can be performed on a component by component basis. In addition, the size of the tiles of each component can be determined arbitrarily. Thus, borders of the tiles of each component do not overlap (coincide with) each other. Therefore, it is possible to avoid elicitation of borders of tiles even in a case where image data compressed with a high compression rate are decompressed.

Additionally, there is provided according to another aspect of the present invention, an image compression apparatus, including: a tile size determiner that determines the size of a rectangular tile for each frame of a moving image, the moving image having a set of successive still images, and each of the still images having a plurality of components and corresponding to the frame; an image divider that divides each of the image using the rectangular tiles; and an image compression processor that performs an irreversible compression process on the image divided by the image divider.

In the above-mentioned aspect of the present invention, the above-described solution for a still image is applied to a moving image. According to this aspect of the present invention, it is possible to determine a tile size of an original image for each frame, or each component in each frame. In addition, the tile size can be determined arbitrarily. Thus, the borders of the tiles do not overlap each other temporally (in time) nor spatially. As a result, it is possible to control the elicitation of borders of tiles so as to be substantially low.

Additionally, according to another aspect of the present invention, the image compression processor may include a discrete cosine transformer, a quantization part and an entropy coder, and may perform a compression process on an image divided by the image divider of the above-described image compression apparatus.

According to the above-mentioned aspect of the present invention, it is possible to apply an apparatus according to the above-described image compression apparatus for realizing an image compression process to a method using DCT such as JPEG or the like.

Further, according to another aspect of the present invention, the image compression processor of the above-described image compression apparatus may include a two-dimensional reversible discrete wavelet transformer, a quantization part and an entropy coder, and may perform a compression process on an image divided by the image divider of the above-described image compression apparatus.

According to the above-mentioned aspect of the present invention, it is possible to apply an apparatus according to the above-described image compression apparatus for realizing an image compression process to a method using DWT such as JPEG 2000 or the like.

Additionally, there is provided according to another aspect of the present invention, an image decompression apparatus decompressing a compressed image compressed by the image compression apparatus, including: an image decompression processor that decompresses the compressed image based on information of the rectangular tiles included in the compressed image, the sizes of the rectangular tiles being determined by the tile size determiner.

According to the above-mentioned aspect of the present invention, it is possible to decompress a compressed image on which a compression process is performed by the above-described image compression apparatus.

Additionally, according to another aspect of the present invention, the image decompression processor of the above-described image decompression apparatus may include an entropy decoder, a reverse quantization part and an inverse discrete cosine transformer.

According to the above-mentioned aspect of the present invention, it is possible to apply an-apparatus according to the above-described image decompression apparatus for realizing an image decompression process to a method using discrete cosine transformation (DCT) such as JPEG and the like.

Additionally, according to another aspect of the present invention, the image decompression processor of the above-described image decompression apparatus may include an entropy decoder, a reverse quantization part and a two-dimensional reversible discrete wavelet inverse transformer.

According to the above-mentioned aspect of the present invention, it is possible to apply an apparatus according to the above-described image decompression apparatus for realizing an image decompression process to a method using discrete wavelet transformation (DWT) such as JPEG 2000 and the like.

Additionally, according to another aspect of the present invention, there is provided an image compression method, including the steps of: (a) determining the size of a rectangular tile for each component of a still image having a plurality of components; (b) dividing the image using the rectangular tiles, the sizes of the rectangular tiles being determined in step (a); and (c) performing an irreversible compression process on the divided image divided in step (b).

Additionally, according to another aspect of the present invention, there is provided an image compression method, including the steps of: determining the size of a rectangular tile for each frame of a moving image, the moving image including a set of successive still images, each of the still images having a plurality of components and corresponding to the frame, and the size of the rectangular tile is determined arbitrarily; dividing the image using the rectangular tiles, the size of the rectangular tiles being determined in step (a); and performing an irreversible compression process on the divided image divided in step (b).

Additionally, there is provided according to another aspect of the present invention, an image decompression method decompressing a compressed image compressed with the above-described image compression method, wherein the compressed image is decompressed based on information of the rectangular tiles included in the compressed image, the rectangular tiles having predetermined sizes.

According to the above-mentioned aspects of the present invention, it is possible to perform tile division of an original image for each component, each frame or each component in each frame. In addition, the sizes of the rectangular tiles are determined arbitrarily. Thus, it is possible to control the elicitation of borders of tiles and to improve image quality both in still images and moving images.

Additionally, there is provided according to another aspect of the present invention, a computer program product for causing a computer to carry out an image compression process, including: computer readable program code means for causing the computer to function as the above-described image compression apparatus; and computer readable program code means for causing the computer to function as one or more of the parts of the image compression apparatus.

Additionally, there is provided according to another aspect of the present invention, a computer program product for causing a computer to carry out an image decompression process, including: computer readable program code means for causing the computer to function as the above-described image decompression apparatus.

Further, there is provided according to another aspect of the present invention, a computer-readable recording medium recording a program thereon for causing a computer to carry out an image compression process, the program including: computer readable program code means for causing the computer to function as the above-described image compression apparatus; and computer readable program code means for causing the computer to function as one or more of the parts of the image compression apparatus.

Additionally, there is provided according to another aspect of the present invention, a computer-readable recording medium recording a program thereon for causing a computer to carry out an image decompression process, the program including: computer readable program code means for causing the computer to function as the above-described image decompression apparatus.

According to the above-mentioned aspects of the present invention, it is possible to carry out a program having functions of the image compression process and the image decompression process. Thus, it is possible to control deterioration in image quality due to tile division.

Other objects, features and advantages of the present invention will become more apparent from the following detailed description when read in conjunction with the following drawings.

BRIEF DESCRIPTION OF THE DRAWINGS

FIG. 2 is a block diagram for explaining the basis of the JPEG 2000 algorithm;

DETAILED DESCRIPTION OF THE PREFERRED EMBODIMENTS

Figure 1:
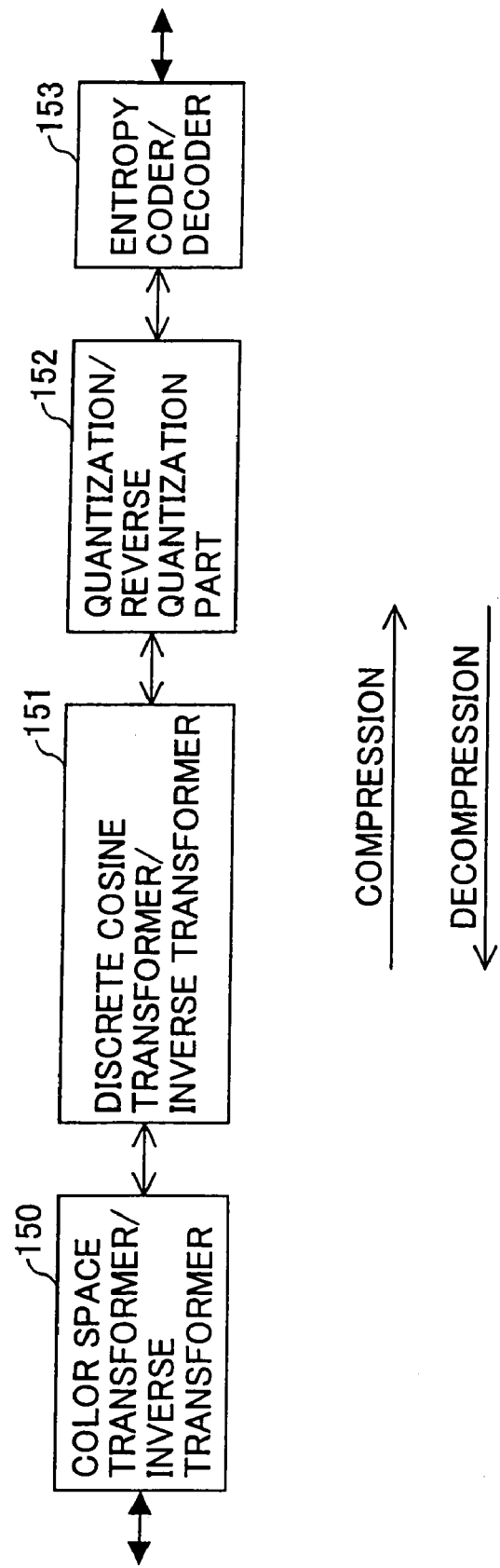
FIG. 1 is a block diagram for explaining the basis of the JPEG algorithm.
Figure 3A:
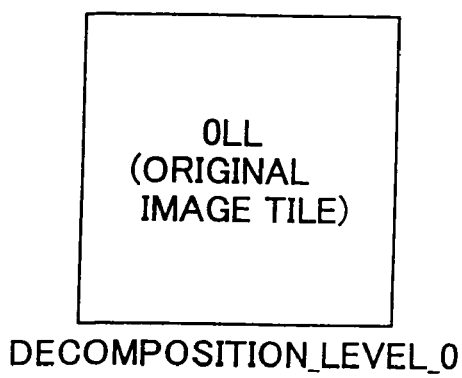
FIGS. 3A, 3B, 3C and 3D are schematic diagrams showing sub-bands of respective decomposition levels in a case where the number of decomposition levels is three.
Figure 3B:
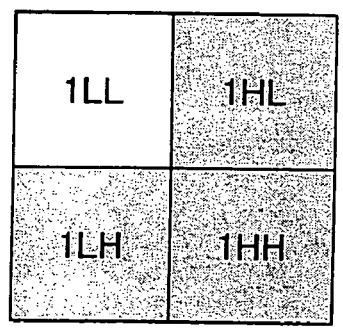
Figure 3C:
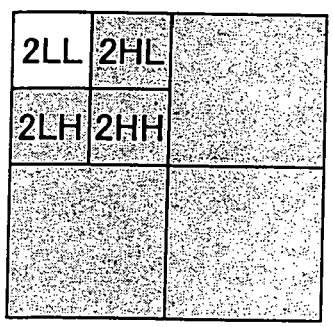
Figure 3D:
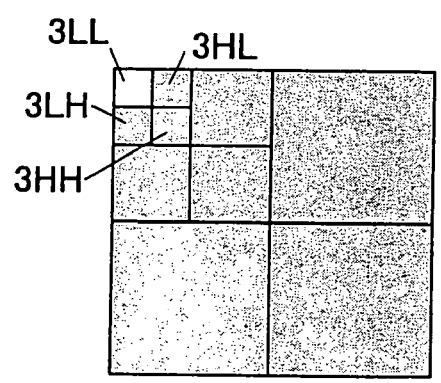
Figure 4:
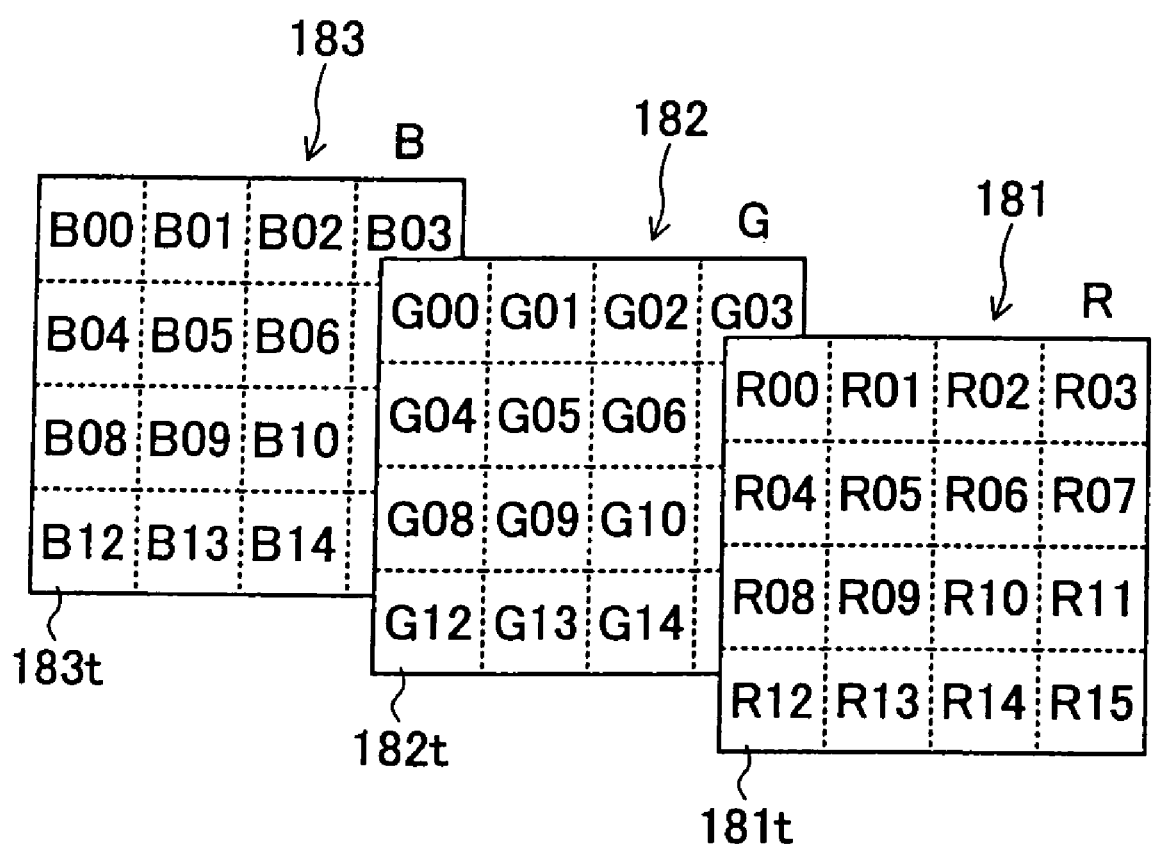
FIG. 4 is a schematic diagram showing an example of each component of a color image on which a tile division is performed.
Figure 5:
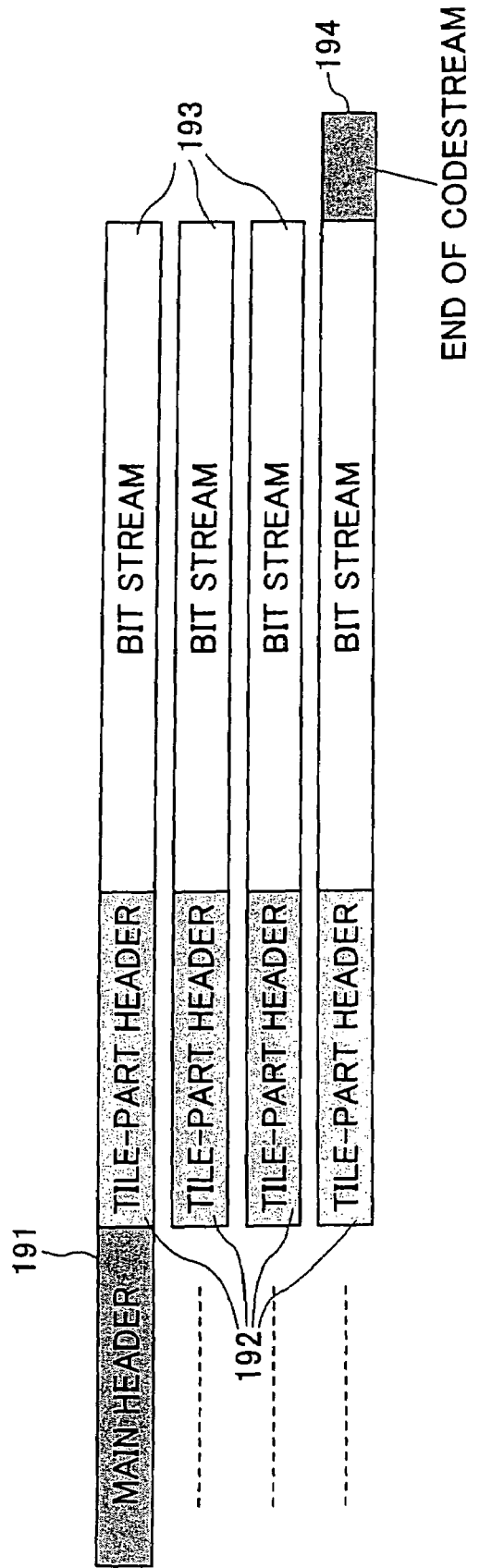
FIG. 5 is a data diagram showing the structure of a codestream.
Figure 6:
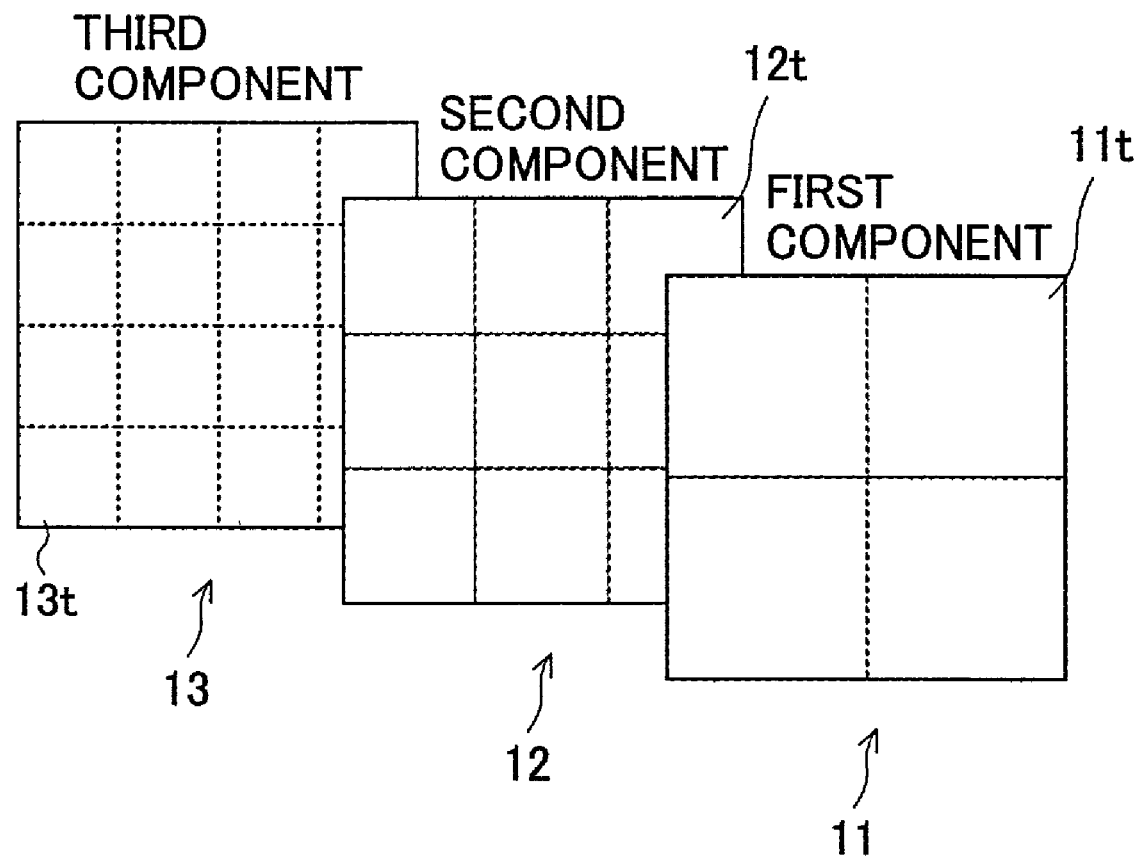
FIG. 6 is a schematic diagram for explaining tile division for each component of a still image in an image compression/decompression apparatus and an image compression/decompression method according to one embodiment of the present invention.

FIG. 6 is a schematic diagram for explaining tile division for each component of a still image in an image compression/decompression apparatus and image compression/decompression method according to one embodiment of the present invention.

The image compression apparatus according to this embodiment includes a tile size determiner, an image divider, and an image compression processor. The tile size determiner determines the size of a rectangular tile of each component for a still image having a plurality of components. The image divider divides an image using rectangular tiles (referred to as "tile", hereinafter) determined by the tile size determiner. The image compression processor performs an irreversible compression process on the still image divided by the image divider. It should be noted that the component includes a zone component (not limited to a wavelength in a visible region) such as a spectrum band as well as a component of color space such as RGB, YUV, YCbCr or the like. In addition, on the occasion of performing the tile division, the location of the tile is indicated by using a coordinate axis referred to as a reference grid, for example. The location may be determined based on an offset and a sampling interval that is set. Also, other methods may be used for indicating the location.

Further, here the image decompression apparatus according to the present invention refers to an apparatus that decompresses a compressed image based on information of tiles determined by the tile size determiner. It should be noted that, in this case, the above-mentioned image has been compressed by the image compression apparatus according to each embodiment of the present invention that will be described later. The image decompression apparatus may be used independently, of course, and in addition, the image decompression apparatus may be also used together with the image compression apparatus. This also applies to the following embodiments, and the description thereof will be omitted.

As shown in FIG. 6, a first component 11, a second component 12 and a third component 13 determine the sizes of rectangular tiles $11_t$, $12_t$ and $13_t$, respectively. Conventionally, borders of the tiles were completely overlapped (coincided with each other). However, according to this embodiment, it is possible to shift the borders of the tiles between the components by employing such a tile size structure. For this reason, even when decoding an image compressed with a high compression rate, the borders of the tiles can be made inconspicuous.

Figure 7:
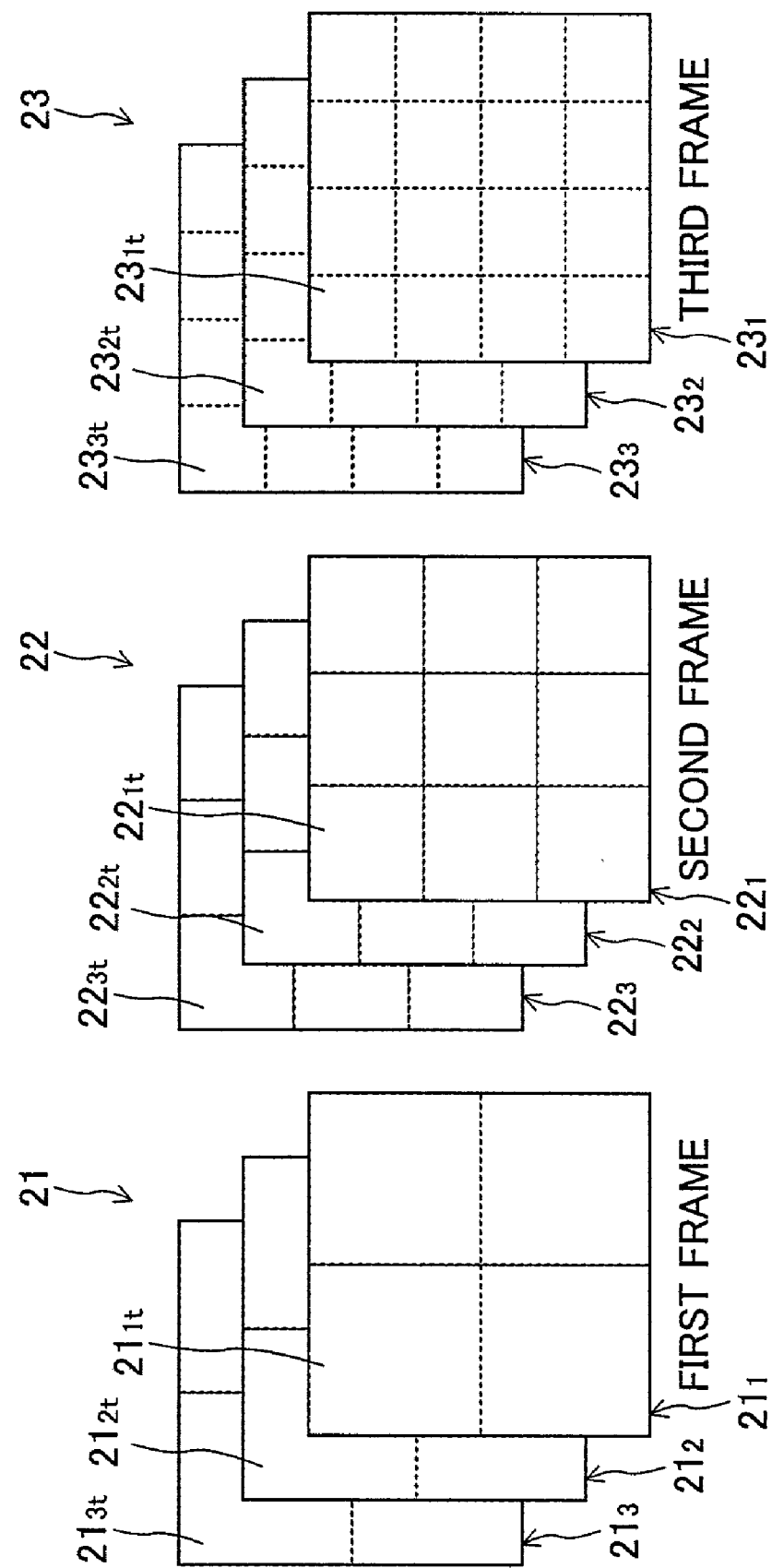
FIG. 7 is a schematic diagram for explaining a tile division in an image compression/decompression apparatus for a moving image according to another embodiment of the present invention.
Figure 8:
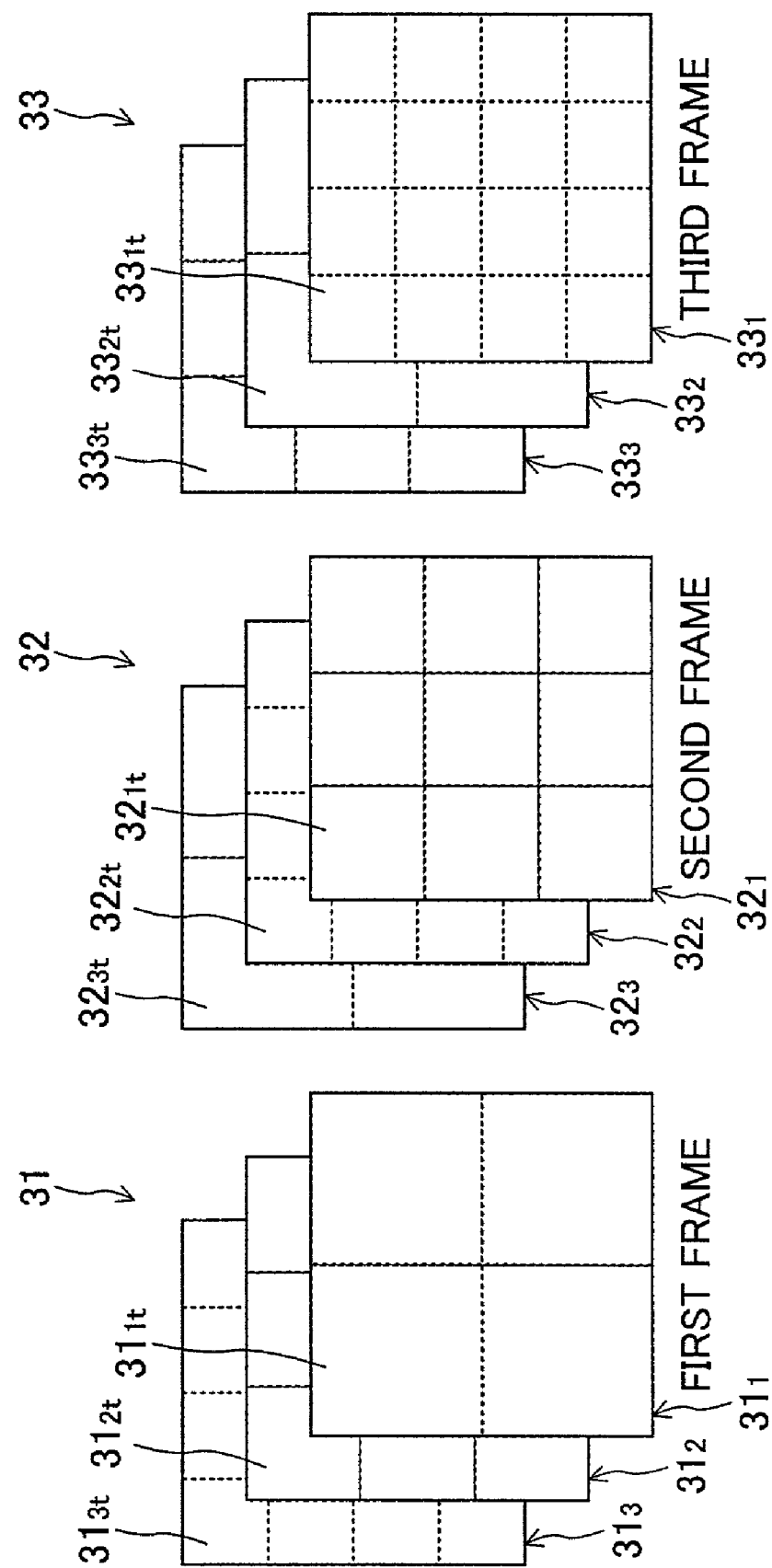
FIG. 8 is a schematic diagram for explaining a tile division in an image compression/decompression apparatus for a moving image according to another embodiment of the present invention.

FIGS. 7 and 8 are schematic diagrams for explaining the tile division of the image compression/decompression apparatus for a moving image according to another embodiment of the present invention.

The image compression/decompression apparatus according to this embodiment compresses/decompresses a moving image. The moving image includes frames. Each of the frames corresponds to one of a plurality of continuous still images each having a plurality of components. The image compression apparatus of this embodiment also includes a tile size determiner, an image divider, and an image compression processor. The image divider and the image compression processor perform the same process as those corresponding parts of the above-mentioned embodiment. The tile size determiner determines the size of the rectangular tiles for each of the frames of a moving image, that is, a plurality of continuous motion still images.

Additionally, the tile size determiner may include a part for determining the size of the rectangular tiles for each component of each of the frames.

FIG. 7 illustrates a first frame 21, a second frame 22 and a third frame 23, each including three components. The first frame 21 includes tiles $21_{1t}$ through $21_{3t}$. The second frame 22 includes tiles $22_{1t}$ through $22_{3t}$. The third frame 23 includes tiles $23_{1t}$ through $23_{3t}$. Each of the frames 21 through 23 has a different tile size. It should be noted that, in this case, each of the components in a single frame has the same tile size. For example, in the first frame 21, the tiles $21_{1t}$ through $21_{3t}$ of the components $2_1$ through $21_3$, respectively, have the same tile size.

In FIG. 8, a case is shown where each component of a single frame has a different tile size. Taking a first frame 31 as an example, the tile size of a tile $31_{1t}$ of a first component $31_1$ is different from those of tiles $31_{2t}$ and $31_{3t}$ of a second component $31_2$ and a third component $31_3$, respectively.

In both cases shown in FIGS. 7 and 8, it is possible to shift the borders of the tiles that in the conventional methods completely overlap in all the frames. As a result, the borders of the tiles can be made inconspicuous even in decoding an image compressed with a high compression rate. Especially, in the case shown in FIG. 8, greater effect can be expected since the borders of the tiles are shifted between the components as well as between the frames.

Figure 9:
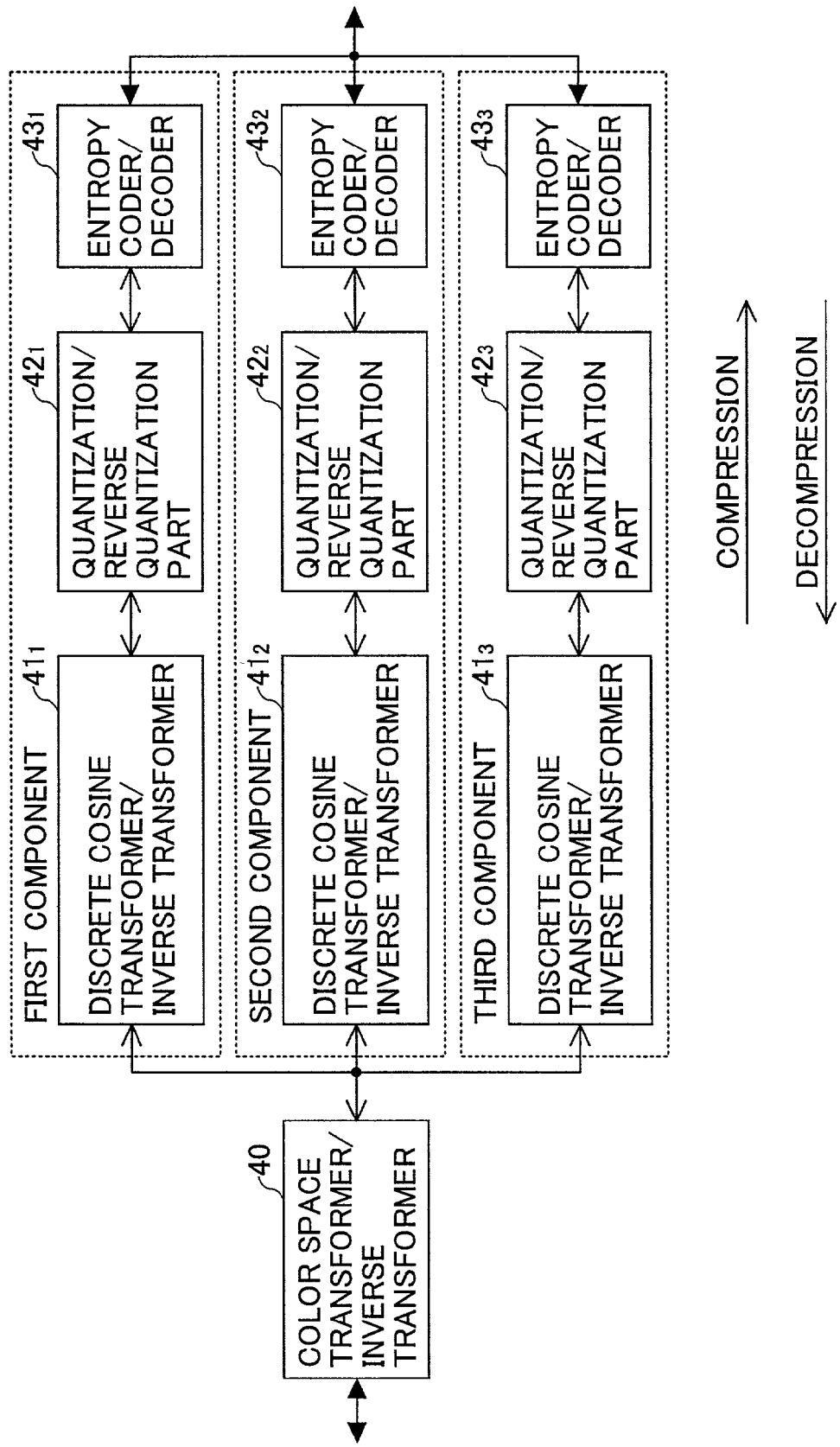
FIG. 9 is a block diagram showing an example of the structure of an image compression/decompression apparatus according to one embodiment of the present invention.
Figure 10:
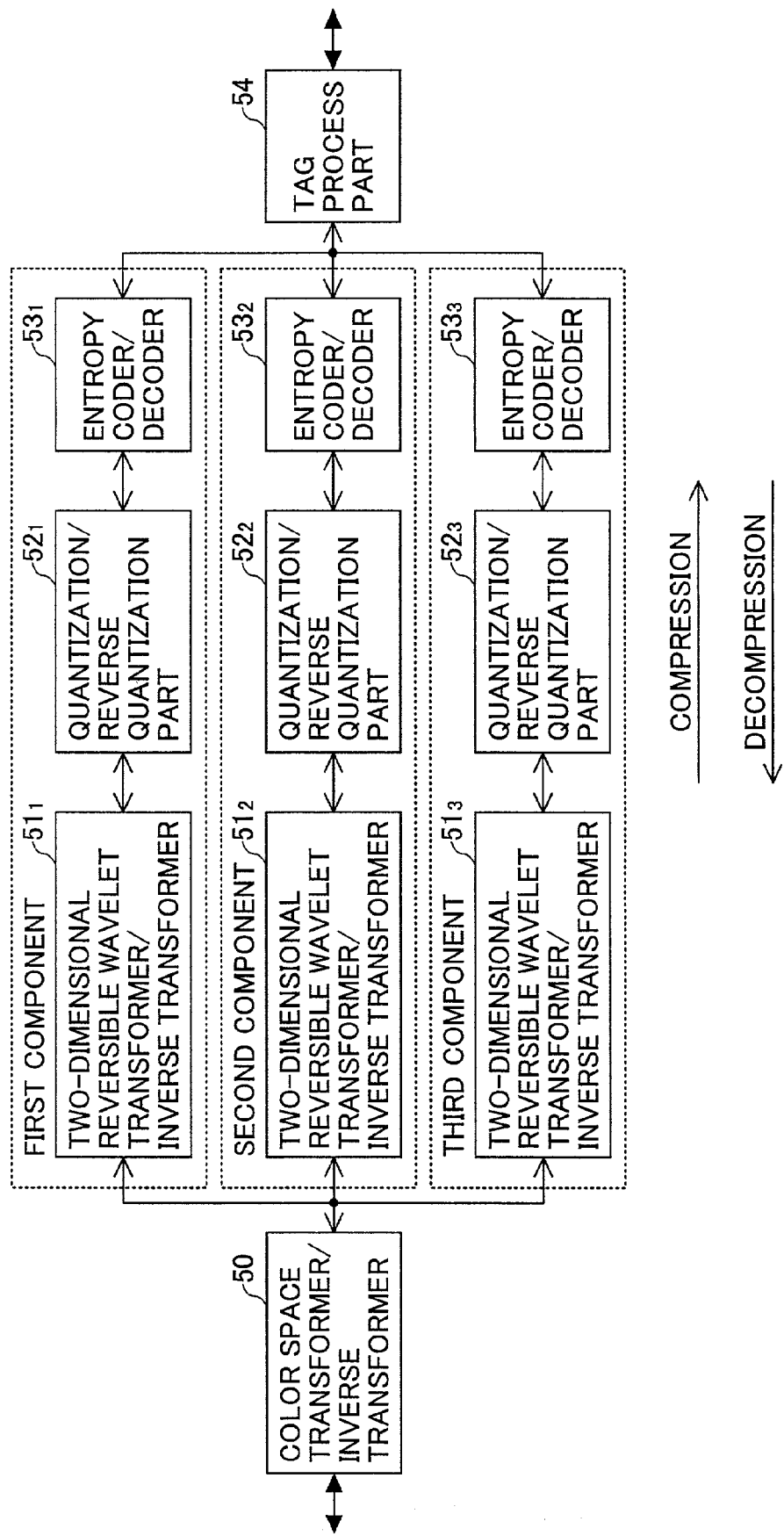
FIG. 10 is a block diagram showing another example of the structure of an image compression/decompression apparatus according to one embodiment of the present invention.

FIGS. 9 and 10 are block diagrams showing examples of the structure of an image compression/decompression apparatus according to another embodiment of the present invention. FIG. 9 shows a case where the image compression/decompression apparatus according to the above-described embodiment or an embodiment that will be described later is applied to a method using DCT including conventional JPEG. FIG. 10 shows a case where the image compression/decompression apparatus according to the above-described embodiment or an embodiment that will be described later is applied to a method using DWT including JPEG 2000. It should be noted that, in FIGS. 9 and 10, each transformer/inverse transformer is illustrated as one part so as to correspond to both compression and decompression of images. However, of course, the single transformer/inverse transformer may be divided into a transformer and an inverse transformer. Further, it should be also noted that, in FIGS. 9 and 10, the cases are shown where each process block is arranged in a line for each component so as to achieve speeding up of the processes of compression and decompression.

That is, in the algorithm of a DCT method (FIG. 9), as input from or output to a color space transformer/inverse transformer 40, through a tile division or a tile integration process, there are provided three sets of processing blocks. The three sets correspond to a first component, a second component, and a third component. The set for the first component includes a discrete cosine transformer/inverse transformer $41_1$, a quantization/reverse quantization part $42_1$, and an entropy coder/decoder $43_1$. The set for the second component includes a discrete cosine transformer/inverse transformer $41_2$, a quantization/reverse quantization part $42_2$, and an entropy coder/decoder $43_2$. The set for the third component includes a discrete cosine transformer/inverse transformer $41_3$, a quantization/reverse quantization part $42_3$, and an entropy coder/decoder $43_3$.

Additionally, in the algorithm of a DWT method (FIG. 10), as an input from or output to a color space transformer/inverse transformer 50, through a tile division or a tile integration process, and as input to or output from a tag processing part 54, there are provided three sets of processing blocks. The three sets correspond to a first component, a second component, and a third component. The set for the first component includes a two-dimensional reversible wavelet transformer/inverse transformer $51_1$, a quantization/reverse quantization part $52_1$ and an entropy coder/decoder $53_1$. The set for the second component includes a two-dimensional reversible wavelet transformer/inverse transformer $51_2$, a quantization/reverse quantization part $52_2$ and an entropy coder/decoder $53_2$. The set for the third component includes a two-dimensional reversible wavelet transformer/inverse transformer $51_3$, a quantization/reverse quantization part $52_3$ and an entropy coder/decoder $53_3$. In any case, it is possible to perform the processes of compression and decompression by varying the tile size of each of the components.

Figure 11:
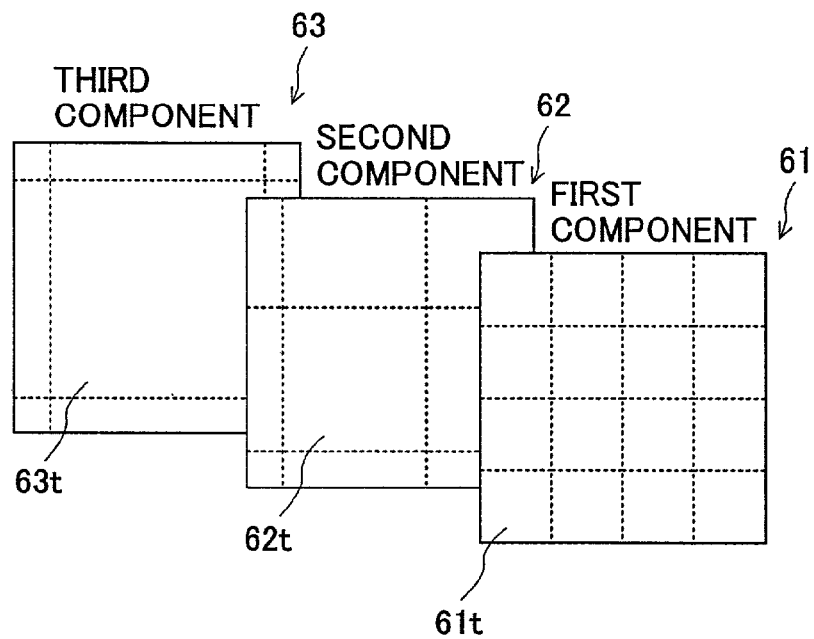
FIG. 11 is a schematic diagram for explaining a case where, in an image compression/decompression apparatus according to an embodiment of the present invention, lengths of a horizontal side and a vertical side of a tile determined for each component are integral multiples of those of a minimum tile.
Figure 12:
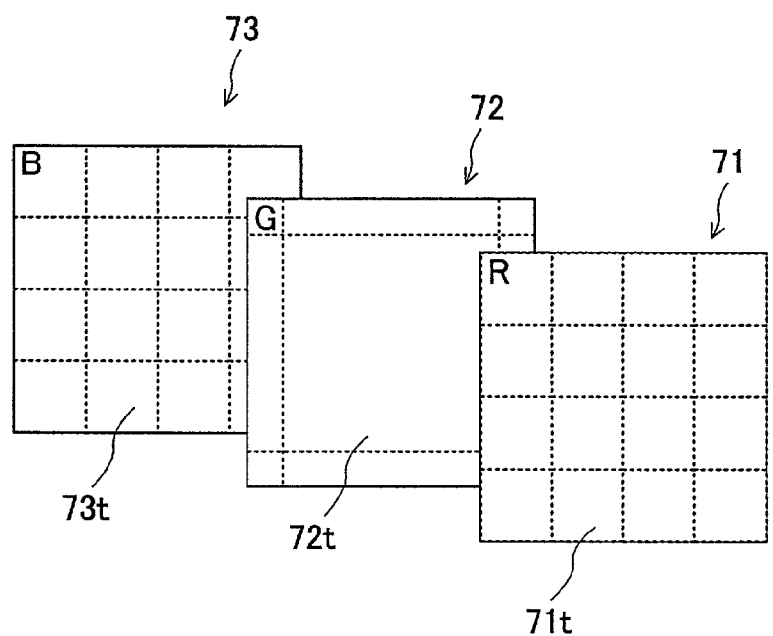
FIG. 12 is another schematic diagram for explaining a case where, in an image compression/decompression apparatus according to an embodiment of the present invention, lengths of a horizontal side and a vertical side of a tile determined for each component are integral multiples of those of a minimum tile.
Figure 13:
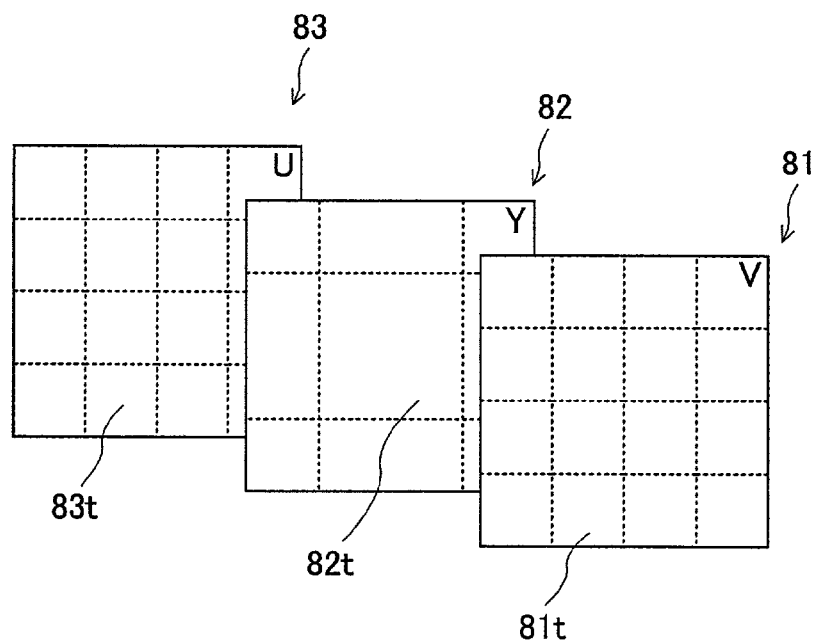
FIG. 13 is another schematic diagram for explaining a case where, in an image compression/decompression apparatus according to an embodiment of the present invention, lengths of a horizontal side and a vertical side of a tile determined for each component are integral multiples of those of a minimum tile.

FIGS. 11 through 13 are schematic diagrams for explaining a case where, in an image compression/decompression apparatus according to an embodiment of the present invention, the lengths of vertical and horizontal sides of a tile are determined for each component so that the lengths correspond to integral multiples of lengths of vertical and horizontal sides of a minimum tile of one component.

The image compression apparatus according to this embodiment also includes a tile size determiner as in the above-mentioned embodiments. In this embodiment, the tile size determiner determines lengths of vertical and horizontal sides of a rectangular tile of one component as a minimum rectangular tile. Additionally, the tile size determiner determines respective lengths of vertical and horizontal sides of rectangular tiles of other components.

In FIG. 11, a tile $61_t$ of a first component is determined as the minimum tile. Lengths of vertical and horizontal sides of a tile $62_t$ of a second component are twice as long as those of the tile $61_t$. Lengths of vertical and horizontal sides of a tile $63_t$ of a third component are three times as long as those of the tile $61_t$.

FIG. 12 illustrates three components of an RGB color system. That is, an R component 71, a G component 72 and a B component 73. In FIG. 12, a case is shown where lengths of vertical and horizontal sides of a tile $72_t$ of the G component are integral multiples (here, three times) that of tiles $71_t$ and $73_t$ of the R component and the B component, respectively.

Additionally, FIG. 13 illustrates three components of YUV system, that is, a V component (luminance) 81, a Y component (red chrominance signal—Y, red color difference) 82 and a U component (blue chrominance signal—Y, blue color difference) 83. In FIG. 13, a case is shown where lengths of vertical and horizontal sides of a tile $82_t$ of the Y component are integral multiples (here, two times) of those of tiles $81_t$ and $83_t$ of the V component and the U component, respectively.

As mentioned above, by determining a tile size to be an integral multiple of that of a minimum tile, it is possible to simplify processes relating to the tile division among the compression/decompression processes. Further, by making the tile sizes of the G component (in the RGB color system) and the Y component (YUV system) that contribute to visual perception to be integral multiples of the tile sizes of the other components, tile division is further simplified, and at the same time, improvement in image quality can be expected. However, it should be noted that, in this case, it is necessary to shift borders of tiles of at least one component in each image.

Figure 14:
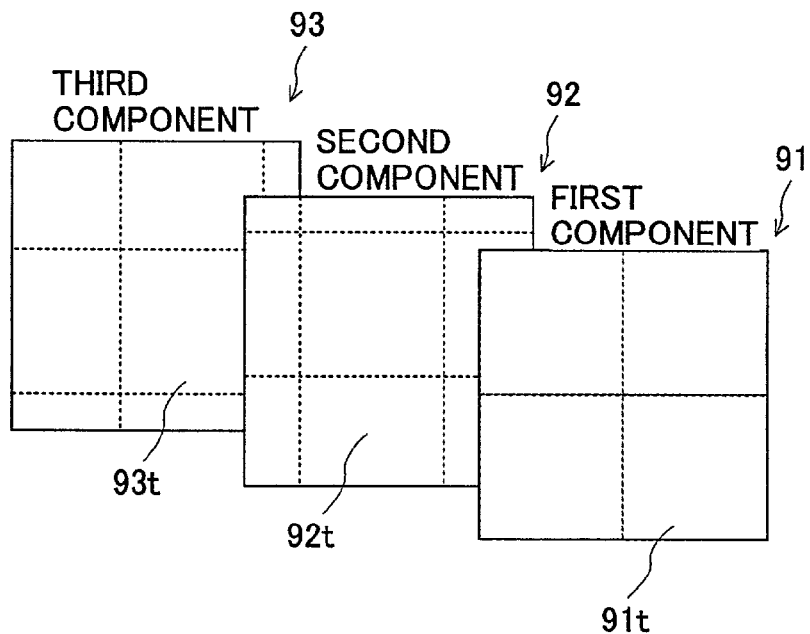
FIG. 14 is a schematic diagram for explaining a case where, in an image compression/decompression apparatus according to an embodiment of the present invention, borders of tiles determined for each component differ from those of other components.
Figure 15:
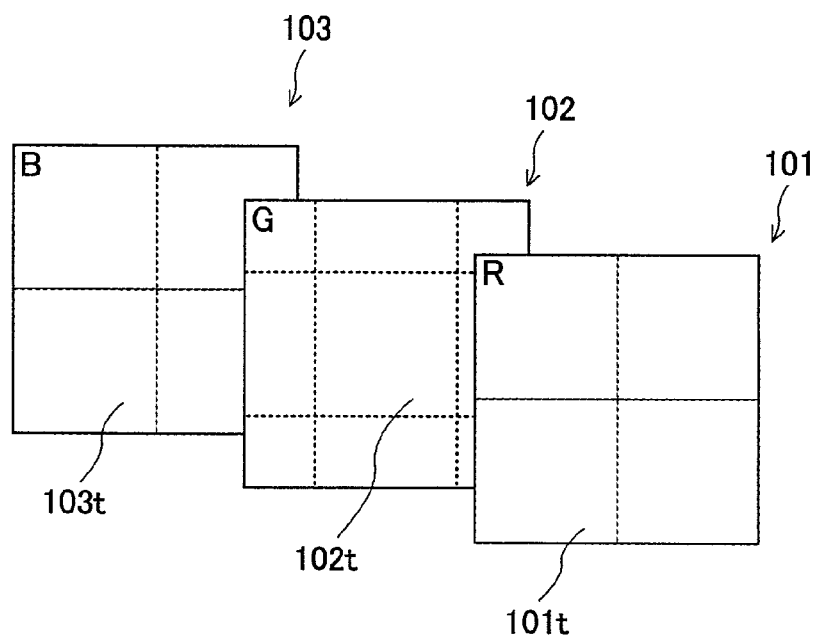
FIG. 15 is another schematic diagram for explaining a case where, in an image compression/decompression apparatus according to an embodiment of the present invention, borders of tiles determined for each component differ from those of other components.
Figure 16:
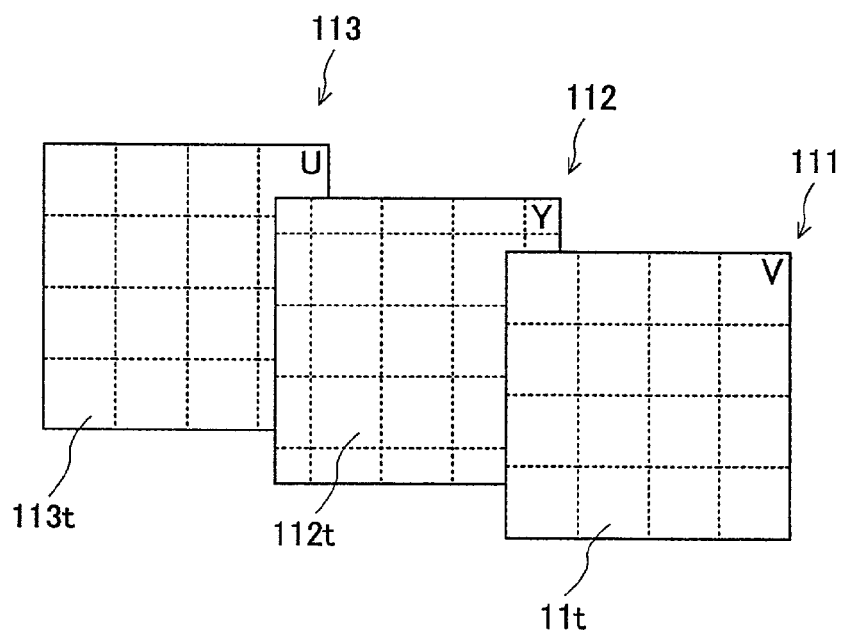
FIG. 16 is another schematic diagram for explaining a case where, in an image compression/decompression apparatus according to an embodiment of the present invention, borders of tiles determined for each component differ from those of other components.

FIGS. 14 through 16 are schematic diagrams for explaining a case where, in an image compression/decompression apparatus according to an embodiment of the present invention, each component has borders of tiles different from other components.

In FIG. 14, every tile of every component has the same tile size. In other words, tiles $91_t$, $92_t$ and $93_t$ of a first component, a second component and a third component, respectively, are the same size. However, the positions of the tiles of each of the components are shifted relatively, so that borders of the tiles of each of the component do not overlap each other.

Additionally, FIG. 15 shows a case where, in an RGB color system, borders of the tile $102_t$ of the G component 102 are different from those of tiles $101_t$ and $103_t$ of the other two components (an R component 101 and a B component 103, respectively).

Further, FIG. 16 shows a similar case with respect to YUV system. In FIG. 16, borders of a tile $112t$ of a Y component 112 are set so as to not overlap, that is, not coincide with, the borders of tiles $111t$ and $113t$ of the other two components (a V component 111 and a U component 113, respectively).

As mentioned above, it is possible to simplify the processes relating to the tile division among the compression/decompression processes by employing a common tile size among components, and setting borders of tiles of each component so as not to overlap each other. In addition, it is possible to further simplify the tile division processes and to expect the improvement in quality of images at the same time, by preventing only borders of tiles of the G component (in RGB systems) or the Y component (in YUV systems) that significantly contribute to visual perception from overlapping with borders of tiles of the other two components.

Figure 17:
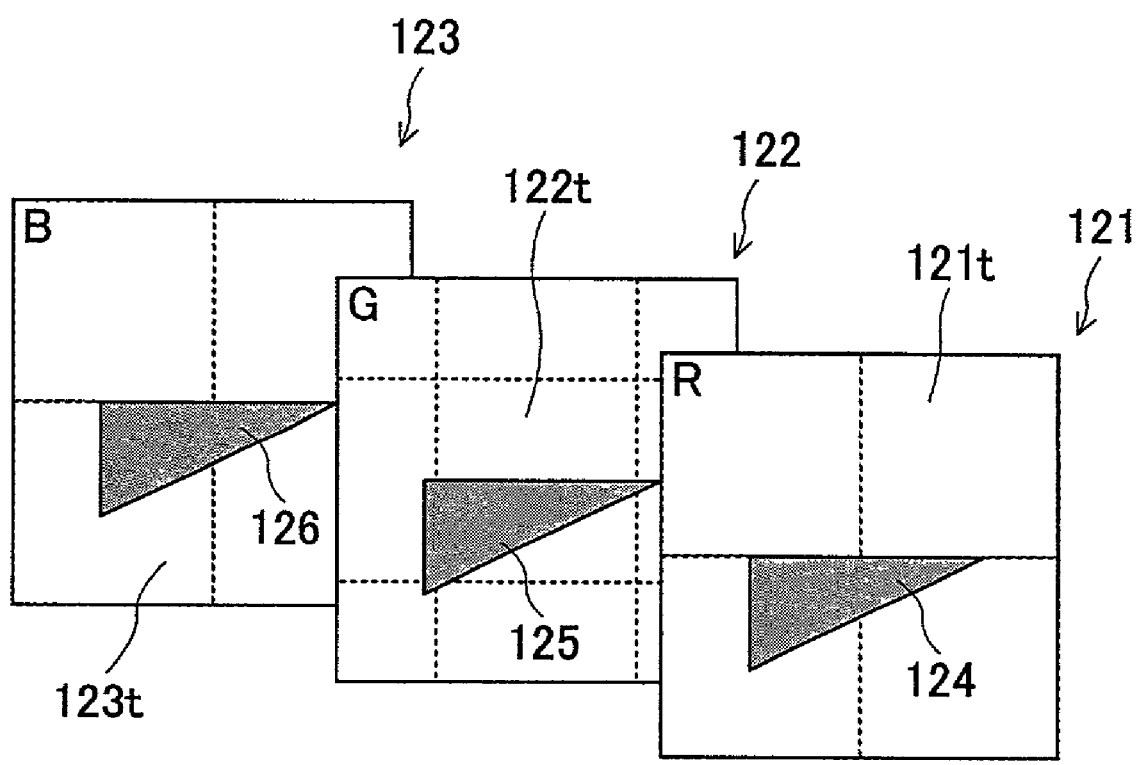
FIG. 17 is a schematic diagram for explaining a case where, in an image compression/decompression apparatus according to another embodiment of the present invention, borders of tiles determined for each component do not match (do not coincide with) a horizontal line or a vertical line of an object included in an original image.

FIG. 17 is a schematic diagram for explaining a case where, in an image compression/decompression apparatus according to an embodiment of the present invention, borders or tiles defined for each component do not match horizontal lines or vertical lines of an object included in an original image.

In this embodiment, borders of tiles $121_t$, $122_t$ and $123_t$ of components 121, 122 and 123, respectively, are defined so as not to match horizontal lines or vertical lines of objects 124, 125 and 126, respectively, included in an original image. It should be noted that the objects 124 through 126 correspond to the same object.

In FIG. 17, the borders of tile $122_t$ of the G component 122 do not match the horizontal line of the object 125 included in the original image. On the other hand, borders of tiles $121_t$ and $123_t$ of the R component 121 and the B component 123, respectively, match the horizontal line of the respective objects 124 and 126. In this case, since only the G component that has the greatest influence on visual perception should be considered, it is easier to realize the image compression/decompression apparatus according to this embodiment, in that only the G component need avoid matching as described above. Additionally, in order to detect horizontal lines and vertical lines of an original image, various methods may be employed such as detecting vertical or horizontal edges by analyzing the image.

Figure 18:
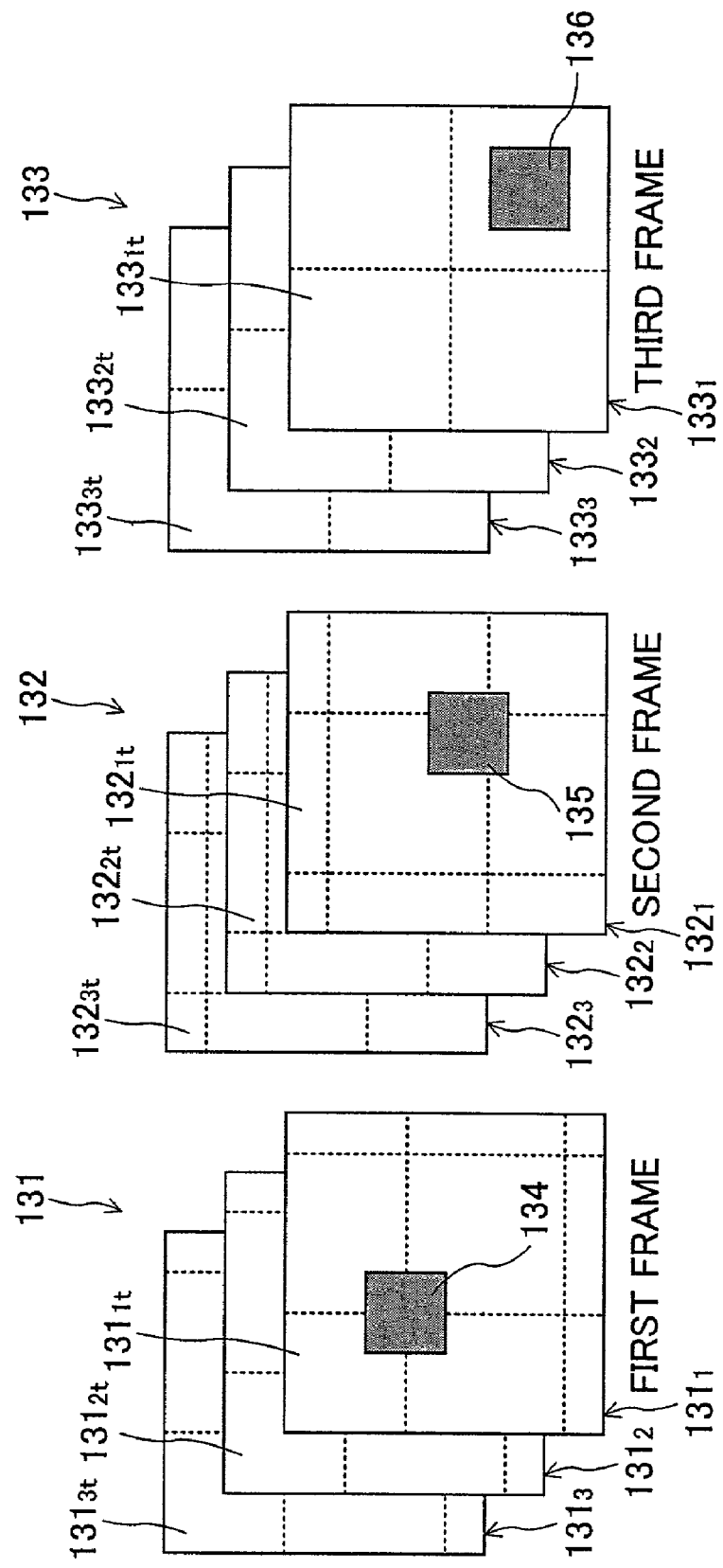
FIG. 18 is a schematic diagram for explaining a case where, in an image compression/decompression apparatus according to another embodiment of the present invention, borders of tiles determined for each frame do not match a horizontal line or a vertical line of an object included in an original image.

FIG. 18 is a schematic diagram for explaining a case where, in an image compression/decompression apparatus according to another embodiment of the present invention, borders of a tile defined for each component do not match horizontal lines or vertical lines of an object included in an original image. In FIG. 18, a case is shown where the same effect as that shown in FIG. 17 is realized for a moving image.

In this embodiment, the tile division is performed such that, in the first frame 131, borders of tiles $131_{1t}$ through $131_{3t}$ in components $131_1$ through $131_3$, respectively, do not match horizontal lines or vertical lines of an object 134 included in an original image. Similarly, in the second frame 132 and the third frame 133, borders of tiles $132_{1t}$ through $132_{3t}$ and $133_{1t}$ through $133_{3t}$ in components $132_1$ through $132_3$ and $133_1$ through $133_3$, respectively, do not match horizontal lines or vertical lines of respective objects 135 and 136 included in the original image. It should be noted that, in FIG. 18, the objects 134 through 136 are assumed to be objects capable of being considered to be the same object. Further, in this embodiment, as shown by the objects 134, 135 and 136, while a box-shaped object is moving toward lower right (134→135→136), the borders of the tiles are being changed in accordance with the movement of the box-shaped object.

Figure 19:
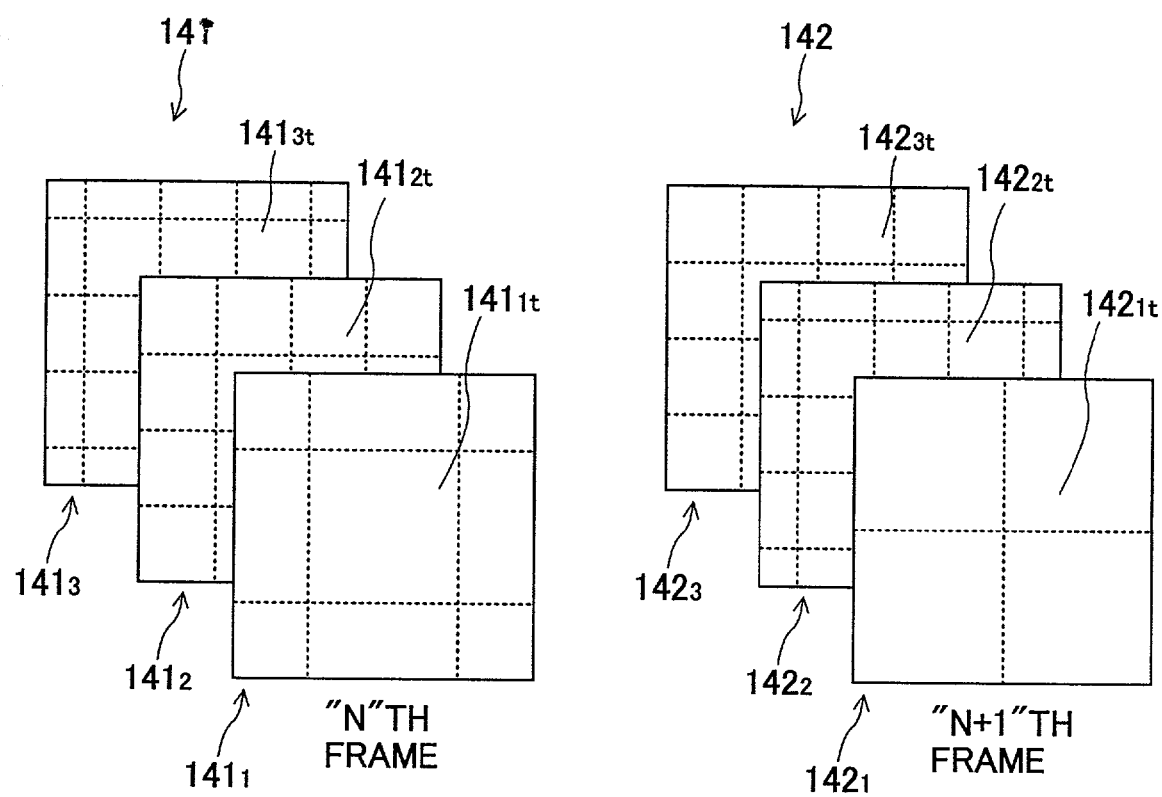
FIG. 19 is a schematic diagram for explaining a case where, in an image compression/decompression apparatus according to another embodiment of the present invention, borders of tiles determined for each frame and for each component differ from those of adjacent frames.

FIG. 19 also illustrates an example of tile division for a moving image similar to FIG. 18. FIG. 19 shows a case where, in an image compression/decompression apparatus according to another embodiment of the present invention, borders of tiles defined for each frame and its components differ from those of adjacent frames and their components. In this embodiment, even components in the same frame have different tile sizes. However, the components may have the same tile size in the same frame.

FIG. 19 shows a case where all tiles $141_{1t}$, $141_{2t}$ and $141_{3t}$ defined in components $141_1$, $141_2$ and $141_3$, respectively, of the "n"th frame move in the next frame ("n+1"th frame) 142 so that borders of the tiles in the "n"th frame do not overlap with those in the "n+1"th frame. Further, in order to differentiate the borders of the tiles between adjacent frames, the borders may be determined by moving the borders regularly for each frame, or by randomly moving the borders for each frame.

Figure 20:
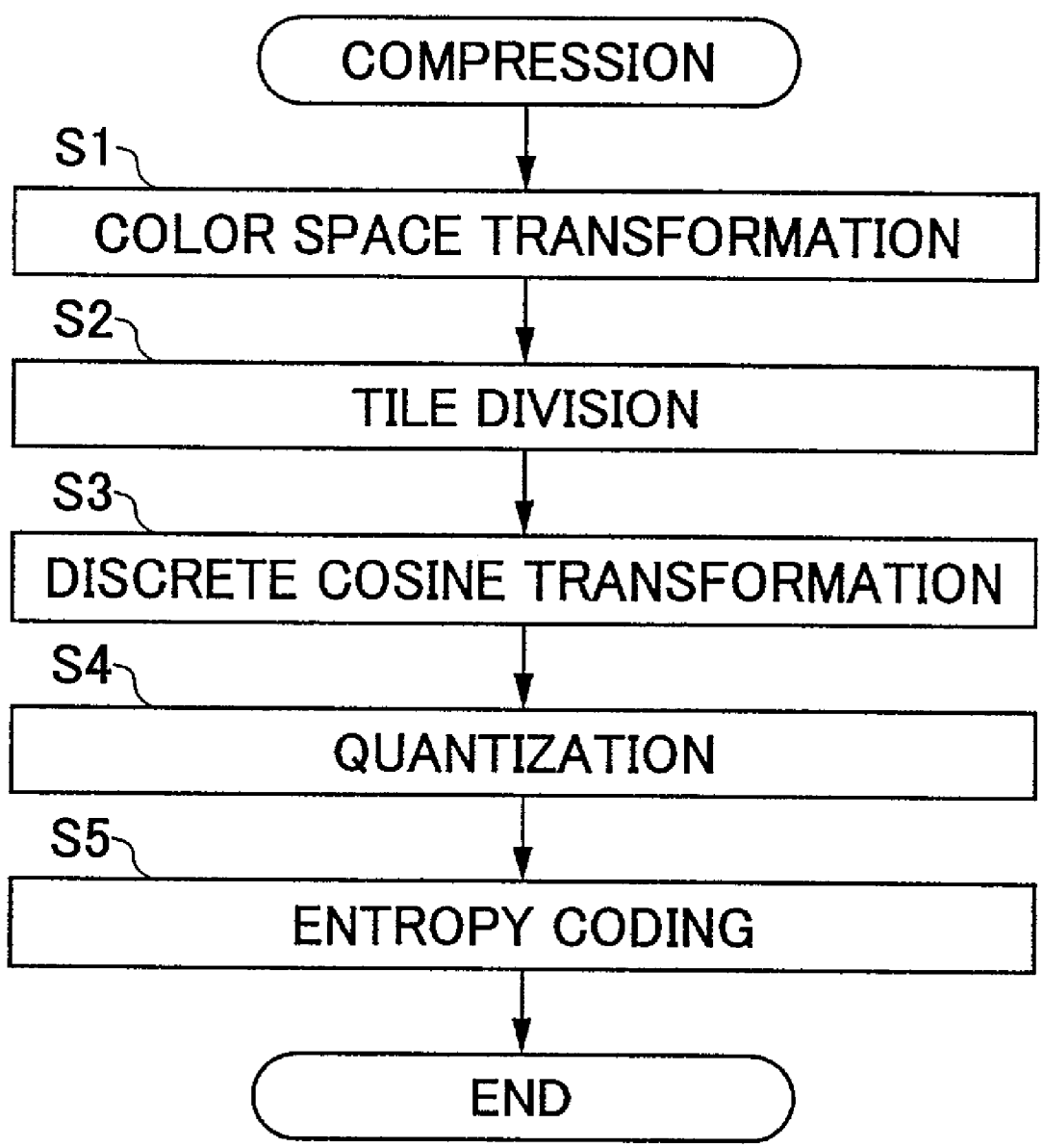
FIG. 20 is a flow chart for explaining an image compression method according to an embodiment of the present invention.

FIG. 20 is a flow chart for explaining an image compression method according to an embodiment of the present invention.

The image compression method according to the present invention is a method to be applied to JPEG systems. First, in step S1, a still image is transformed into a color space. Next, in step S2, tile division is performed on each component (and/or each frame). It is possible to apply each tile division (modification) of the image compression apparatuses according to the above-mentioned embodiments to the tile division in step S2. In step S2, the still image having a plurality of components is divided using predetermined rectangular tiles. The size of the rectangular tile is arbitrarily determined for each of the components. It should be noted that the order of step S1 and step S2 may be reversed according to circumstances. After the tile division in step S2, a discrete cosine transformation is performed in step S3. Thereafter, in step S4, quantization is performed. Lastly, entropy coding is performed in step S5.

Additionally, an image compressed with the above-mentioned image compression method is decompressed with an image decompression method as described in the following. First, an entropy decoding is performed based on information of tile division stored in headers of the compressed image. Then, a reverse quantization and a discrete cosine inverse transformation are performed. Thereafter, a color space inverse transformation is performed by combining each of the tiles so as to generate a decompressed image.

Figure 21:
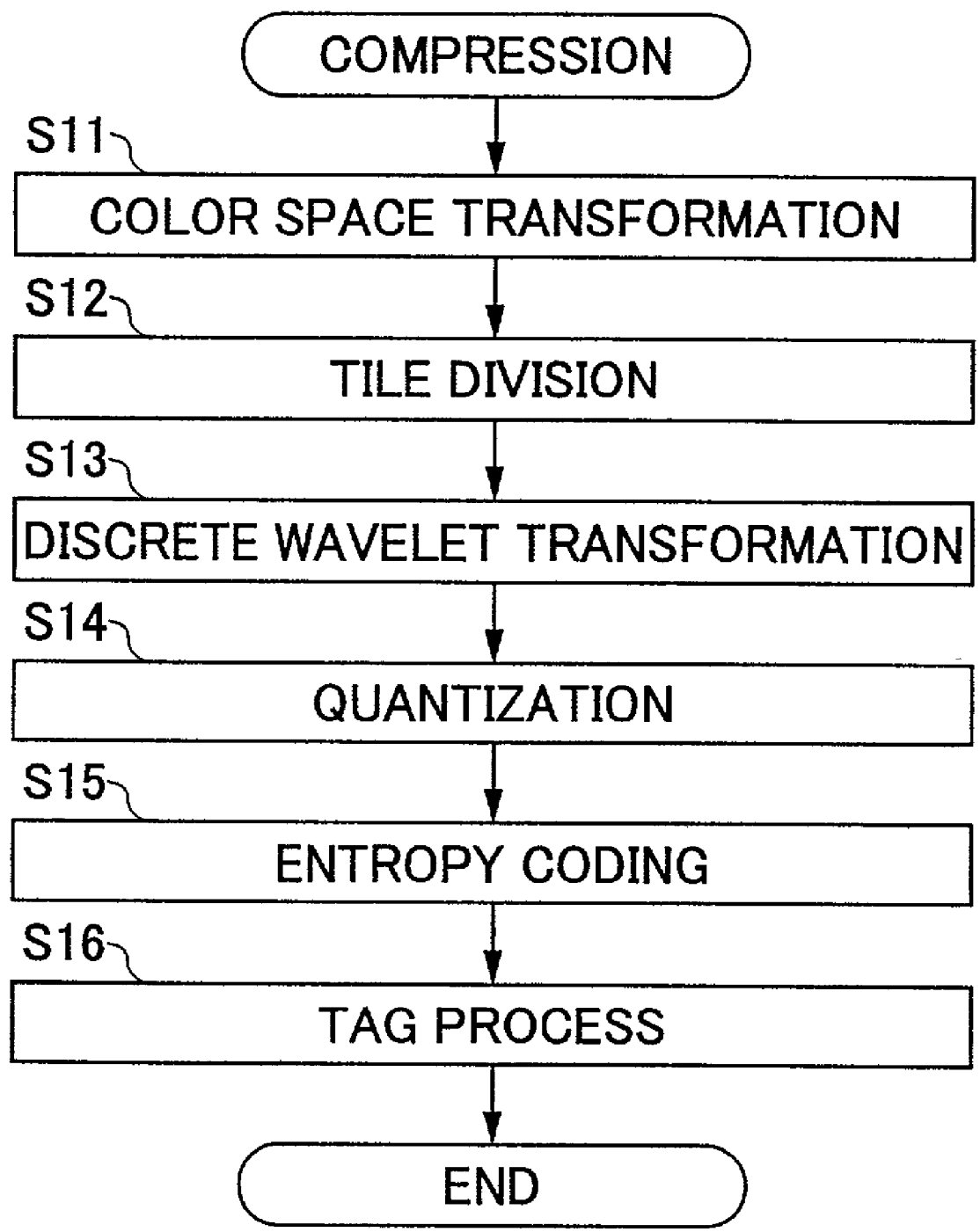
FIG. 21 is another flow chart for explaining an image compression method according to another embodiment of the present invention.

FIG. 21 is a flow chart for explaining an image compression method according to another embodiment of the present invention.

The image compression method according to this embodiment is a method to be applied to JPEG 2000 systems. First, in step S11, a still image is transformed into a color space. Next, in step S12, tile division is performed on each component (and/or each frame). It is possible to apply each tile division (modification) of the image compression apparatuses according to the above-mentioned embodiments to the tile division in step S12. In step S12, the tile division is performed such that the still image is divided using predetermined rectangular tiles. The size of the rectangular tile is arbitrarily determined for each frame. Here, a frame corresponds to one of a plurality of continuous still images structuring a moving image. Additionally, each of the still images has a plurality of components. Additionally, the size of the rectangular tile may be arbitrarily determined for each component of each frame. Further, it should be noted that the order of step S11 and step S12 may be reversed according to circumstances. After the tile division in step S12, a discrete wavelet transformation is performed in step S13. Then, in step S14, a quantization is performed. In step S15, an entropy coding is performed, and thereafter, a tag process is performed in step S16.

In addition, an image compressed by the above-mentioned image compression method is decompressed with an image decompression method as described in the following. First, a tag process is performed based on information of the tile division stored in headers of the compressed image. Then, an entropy decoding, a reverse quantization and an inverse discrete wavelet transformation are performed. Lastly, an inverse color space transformation is performed by combining each of the tiles so as to generate a decompressed image.

In the above, a description has been given with a focus on embodiments of the image compression apparatus, the image decompression apparatus, the image compression method, and the image decompression method according to the present invention. However, it is also possible to embody the present invention in a computer-readable recording medium having a program embodied in the medium therein for causing a computer to function as the above-mentioned apparatuses or as parts of the apparatuses, or for causing a computer to perform the above-mentioned methods.

In the following, a description will be given of an embodiment of a recording medium storing a program or data for realizing the functions of the image compression and decompression according to the present invention. As the recording medium, to be more precise, a CD-ROM, a magnetic optical disk, a DVD-ROM, a FD, a flash memory, and other various ROMs or RAMs may be conceived. By distributing these media recording a program for causing a computer to perform the functions according to the above-mentioned embodiments so as to realize the functions of the image compression and decompression, the functions may be simply realized. Additionally, it is possible to perform the functions of the image compression and image decompression according to the present invention by loading the above-mentioned recording medium into an information processing apparatus such as a computer, and reading a program on the medium by the information processing apparatus. Further, it is also possible to perform the functions of the above-mentioned image compression and image decompression by storing the program in a storing medium provided in an information processing apparatus, and reading the program as occasion demands.

The present invention is not limited to the specifically disclosed embodiments, and variations and modifications may be made without departing from the scope of the present invention.

The present application is based on Japanese priority application No. 2001-159984 filed on May 29, 2001, the entire contents of which are hereby incorporated by reference.

What is claimed is:

1. An image compression apparatus, comprising:
   a tile size determiner that determines a size of a rectangular tile for each component of a still image having a plurality of components, said size being determined arbitrarily;
   an image divider that divides the still image using the rectangular tiles, the sizes of said rectangular tiles being determined by said tile size determiner; and
   an image compression processor that performs a compression process on the still image divided by said image divider,
   wherein the tile size determiner includes a part that determines borders of the rectangular tiles for each of the components such that the borders do not overlap with a horizontal line and a vertical line included in the still image.

2. The image compression apparatus as claimed in claim 1, wherein the image compression processor includes a two-dimensional reversible discrete wavelet transformer, a quantization part and an entropy coder, and performs a compression process on the still image divided by the image divider.

3. An image decompression apparatus decompressing a compressed image compressed by the image compression apparatus as claimed in claim 1, comprising:
   an image decompression processor that decompresses the compressed image based on information of the rectangular tiles included in the compressed image, the sizes of said rectangular tiles being determined by the tile size determiner.

4. The image decompression apparatus as claimed in claim 3, wherein the image decompression processor includes an entropy decoder, a reverse quantization part and an inverse discrete cosine transformer.

5. The image decompression apparatus as claimed in claim 3, wherein the image decompression processor includes an entropy decoder, a reverse quantization part and a two-dimensional reversible discrete wavelet inverse transformer.

6. An image compression apparatus, comprising:
   a tile size determiner that determines a size of a rectangular tile for each component of a still image having a plurality of components, said size being determined arbitrarily;
   an image divider that divides the still image using the rectangular tiles, the sizes of said rectangular tiles being determined by said tile size determiner; and
   an image compression processor that performs a compression process on the still image divided by said image divider,
   wherein the tile size determiner includes a part that determines borders of the rectangular tiles such that the borders of at least one of the components do not match a horizontal line and a vertical line included in the still image.

7. The image compression apparatus as claimed in claim 6, wherein the image compression processor includes a two-dimensional reversible discrete wavelet transformer, a quantization part and an entropy coder, and performs a compression process on the still image divided by the image divider.

8. The image decompression apparatus decompressing a compressed image compressed by the image compression apparatus as claimed in claim 6, comprising:
   an image decompression processor that decompresses the compressed image based on information of the rectangular tiles included in the compressed image, the sizes of said rectangular tiles being determined by the tile size determiner.

9. The image decompression apparatus as claimed in claim 8, wherein the image decompression processor includes an entropy decoder, a reverse quantization part and an inverse discrete cosine transformer.

10. The image decompression apparatus as claimed in claim 8, wherein the image decompression processor includes an entropy decoder, a reverse quantization part and a two-dimensional reversible discrete wavelet inverse transformer.

11. An image compression apparatus, comprising:
a tile size determiner that determines a size of a rectangular tile for each component of a still image having a plurality of components, said size being determined arbitrarily;
an image divider that divides the still image using the rectangular tiles, the sizes of said rectangular tiles being determined by said tile size determiner; and
an image compression processor that performs a compression process on the still image divided by said image divider,
wherein the plurality of components include a R (red) component, a G (green) component and a B (blue) component, and the tile size determiner includes a part that determines borders of the rectangular tiles such that at least the borders of the rectangular tiles in the G component do not match a horizontal line and a vertical line included in the still image.

12. The image compression apparatus as claimed in claim 11, wherein the image compression processor includes a two-dimensional reversible discrete wavelet transformer, a quantization part and an entropy coder, and performs a compression process on the still image divided by the image divider.

13. The image decompression apparatus decompressing a compressed image compressed by the image compression apparatus as claimed in claim 11, comprising:
an image decompression processor that decompresses the compressed image based on information of the rectangular tiles included in the compressed image, the sizes of said rectangular tiles being determined by the tile size determiner.

14. The image decompression apparatus as claimed in claim 13, wherein the image decompression processor includes an entropy decoder, a reverse quantization part and an inverse discrete cosine transformer.

15. The image decompression apparatus as claimed in claim 13, wherein the image decompression processor includes an entropy decoder, a reverse quantization part and a two-dimensional reversible discrete wavelet inverse transformer.

16. An image compression apparatus, comprising:
a tile size determiner that determines a size of a rectangular tile for each component of a still image having a plurality of components, said size being determined arbitrarily;
an image divider that divides the still image using the rectangular tiles, the sizes of said rectangular tiles being determined by said tile size determiner; and
an image compression processor that performs an irreversible compression process on the still image divided by said image divider,
wherein the plurality of components include a Y component, a U component and a Y component, and the tile size determiner includes a part that determines borders of the rectangular tiles such that at least the borders of the rectangular tiles in the Y component do not match a horizontal line and a vertical line included in the still image.

17. The image compression apparatus as claimed in claim 16, wherein the image compression processor includes a two-dimensional reversible discrete wavelet transformer, a quantization part and an entropy coder, and performs a compression process on the still image divided by the image divider.

18. The image decompression apparatus decompressing a compressed image compressed by the image compression apparatus as claimed in claim 16, comprising:
an image decompression processor that decompresses the compressed image based on information of the rectangular tiles included in the compressed image, the sizes of said rectangular tiles being determined by the tile size determiner.

19. The image decompression apparatus as claimed in claim 18, wherein the image decompression processor includes an entropy decoder, a reverse quantization part and an inverse discrete cosine transformer.

20. The image decompression apparatus as claimed in claim 18, wherein the image decompression processor includes an entropy decoder, a reverse quantization part and a two-dimensional reversible discrete wavelet inverse transformer.

* * * * *